US 11,409,702 B2

(12) United States Patent
Yang et al.

(10) Patent No.: US 11,409,702 B2
(45) Date of Patent: Aug. 9, 2022

(54) DISPLAY DEVICE AND CONTROL METHOD THEREFOR

(71) Applicant: SAMSUNG ELECTRONICS CO., LTD., Suwon-si (KR)

(72) Inventors: Jiwon Yang, Suwon-si (KR); Sangheun Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/960,583

(22) PCT Filed: Dec. 20, 2018

(86) PCT No.: PCT/KR2018/016330
§ 371 (c)(1),
(2) Date: Jul. 8, 2020

(87) PCT Pub. No.: WO2019/135522
PCT Pub. Date: Jul. 11, 2019

(65) Prior Publication Data
US 2020/0394153 A1    Dec. 17, 2020

(30) Foreign Application Priority Data
Jan. 8, 2018   (KR) .................. 10-2018-0002191

(51) Int. Cl.
*G06F 16/16* (2019.01)
*G06F 21/62* (2013.01)

(52) U.S. Cl.
CPC .......... *G06F 16/16* (2019.01); *G06F 21/6209* (2013.01)

(58) Field of Classification Search
CPC ............................ G06F 16/16; G06F 21/6209
See application file for complete search history.

(56) References Cited

U.S. PATENT DOCUMENTS 8,266,113 B2    9/2012  Radatti
2002/0111948 A1*  8/2002  Nixon .................. G06F 15/16
(Continued)

FOREIGN PATENT DOCUMENTS

CN          105260654 A     1/2016
JP          2014-059724 A   4/2014
(Continued)

OTHER PUBLICATIONS

International Search Report (PCT/ISA/210), issued by International Searching Authority in corresponding International Application No. PCT/KR2018/016330, dated Apr. 8, 2019.
(Continued)

*Primary Examiner* — Eliyah S. Harper
(74) *Attorney, Agent, or Firm* — Sughrue Mion, PLLC

(57) ABSTRACT

Disclosed is a display apparatus and a control method thereof. The display apparatus includes a display configured to display an image thereon; a storage configured to store a plurality of files therein to display the image; and a processor configured to: generate a first integrity check value of a first file based on at least one second file corresponding to a request for execution of the first file from an application, and identify whether to execute the first file by identifying whether the first integrity check value generated as above is consistent with a second integrity check value of the first file that has been generated based on the at least one second file before the request for execution of the first file was made.

14 Claims, 9 Drawing Sheets

(56) References Cited

U.S. PATENT DOCUMENTS

| | | | |
|---|---|---|---|
| 2004/0199508 A1 | 10/2004 | Radatti | |
| 2009/0132921 A1* | 5/2009 | Hwangbo | G06F 3/04845 |
| | | | 715/716 |
| 2013/0232152 A1* | 9/2013 | Dhuse | G06F 16/9027 |
| | | | 707/741 |
| 2013/0325820 A1* | 12/2013 | Grube | G06F 16/2365 |
| | | | 707/691 |
| 2014/0075499 A1* | 3/2014 | Arun | G06Q 10/06315 |
| | | | 726/1 |
| 2016/0239364 A1 | 8/2016 | Nam et al. | |
| 2016/0378586 A1* | 12/2016 | Cocagne | G06F 11/0727 |
| | | | 714/57 |
| 2017/0153948 A1* | 6/2017 | McShane | H03M 13/1515 |
| 2017/0322743 A1* | 11/2017 | Khadiwala | G06F 3/0689 |

FOREIGN PATENT DOCUMENTS

| | | |
|---|---|---|
| KR | 10-2012-0053398 A | 5/2012 |
| KR | 10-2014-0130408 A | 11/2014 |
| KR | 101482700 B1 | 1/2015 |
| KR | 10-2017-0094736 A | 8/2017 |
| KR | 10-1503785 B1 | 3/2018 |

OTHER PUBLICATIONS

Communication dated Apr. 20, 2022 issued by the Korean Patent Office in application No. 10-2018-0002191.

\* cited by examiner

FIG. 7

661 — rw.so integrity <- hash(rw.so) + hash(ro.so)
662 — ro.so integrity <- hash(rw.so) + hash(ro.so)

FIG. 9

831 ~ rw1.so integrity <- hash(tz_1.so)+hash(ro_1.so)+hash(rw_1.so)
832 ~ rw2.so integrity <- hash(tz_1.so)+hash(ro_1.so)+hash(rw_2.so)
833 ~ rw3.so integrity <- hash(tz_1.so)+hash(ro_2.so)+hash(rw_3.so)
834 ~ rwk.so integrity <- hash(tz_1.so)+hash(ro_k.so)+hash(rw_k.so)

835 ~ ro_1.so integrity <- hash(tz_1.so)+hash(ro_1.so)  +hash(rw_1.so)+hash(rw_2.so)
836 ~ ro_2.so integrity <- hash(tz_1.so)+hash(ro_2.so)  +hash(rw_3.so)+hash(rw_4.so)
837 ~ ro_k.so integrity <- hash(tz_1.so)+hash(ro_k.so)  +hash(rw_5.so)+hash(rw_k.so)

838 ~ tz_1.so integrity <- hash(tz_1.so)+hash(ro_1.so)+hash(ro_2.so)+hash(ro_3.so)

DISPLAY DEVICE AND CONTROL METHOD THEREFOR

TECHNICAL FIELD

The disclosure relates to a display apparatus and a control method thereof, and more particularly to a display apparatus for checking an integrity of files used when an application is executed, and a control method thereof.

BACKGROUND ART

A display apparatus may be hacked by a hacker such as triggering of buffer overflow and arbitrary code execution aiming at vulnerability of a library used in the device. Therefore, it is recommended to check whether a vulnerable library is being used in a display apparatus and to update a firmware to a patched version for security.

In order to check an integrity of a library file such as a shared object (SO) file, conventional display apparatuses compare an integrity check value attached to each SO file and a hash value calculated by using a key of the system and if the two values are consistent with each other, the display apparatuses identify that the SO file has been normally signed, whenever the SO file is executed. That is, the conventional display apparatuses allow only those files, which have been checked as above, to be normally executed.

However, there can be a case where, following a patch of a vulnerable version of a library through firmware update, a hacker, who has a backup of a vulnerable version of an SO file in the previous firmware, replaces such vulnerable version of the SO file with an SO file with updated firmware. That is, the previous version of the SO file had been signed by using the key of the same system, and thus may be executed through an integrity check logic.

Therefore, security measures should be taken to disable any hacking whereby a patched library is returned to the pre-patch version.

Technical Problem

An aspect of the disclosure is to solve the conventional problems described above, and provide a display apparatus for preventing a library file, which has been abnormally replaced, from passing an integrity check, and a control method thereof.

Another aspect of the disclosure is to solve the conventional problems described above, and provide a display apparatus for restraining an application from performing an erroneous operation if a library file has been abnormally replaced.

Technical Solution

According to an embodiment of the disclosure, there is provided a display apparatus. The display apparatus includes: a display configured to display an image thereon; a storage configured to store a plurality of files therein to display the image; and a processor configured to: generate a first integrity check value of a first file based on at least one second file corresponding to a request for execution of the first file from an application, and identify whether to execute the first file by identifying whether the first integrity check value generated as above is consistent with a second integrity check value of the first file that has been generated based on the at least one second file before the request for execution of the first file was made.

According to the embodiment of the disclosure, if the library file has been abnormally replaced, the library file is prevented from passing an integrity check logic. Also, if the library file has been abnormally replaced, an execution of the application may be blocked.

The display apparatus may further includes a communicator for communicating with a server which generates and stores therein a second integrity check value of the first file based on the at least one second file, and the processor may be configured to receive a second integrity check value of the first file from the server, and corresponding to a request for execution of the first file, and identify whether the received second integrity check value is consistent with the first integrity check value. Accordingly, in order to block an execution of a library file if the hacker has replaced the library file with a vulnerable version of the same, the library file may be checked by using the integrity check value downloaded from the server.

The processor may be configured to generate the first integrity check value by using a hash sum of the first file and the at least one second file. Accordingly, the first file may be prevented from passing the integrity check logic for execution if a hacker has replaced the library file updated through firmware with a vulnerable version of the same.

The processor may be configured to generate hash values of the first file and the at least one second file by using an encrypted key. Accordingly, security may be strengthened by using an encrypted key when an integrity check value of a library file is generated.

The at least one second file may include a file which is sequentially adjacent to the first file when the plurality of files is arranged in accordance with a predetermined standard. Accordingly, the method of relating a library file to other library files in a chain form, which other library files exist in the same firmware may be used when an integrity check value of the library file is generated.

The storage may include a read write (RW) zone, a read-only (RO) zone and a trust zone having different security levels, and the at least one second file may include a file stored in the RO zone if the first file is stored in the RW zone. Accordingly, the method of relating a file in the RW zone to a file in the RO zone existing in the same firmware may be used when an integrity check value of a library file is generated.

The storage may include an RW zone, an RO zone and a trust zone having different security levels, and the at least one second file may include a file stored in a zone in the storage that has a higher security level than the first file. Accordingly, a method of relating a file in the zone with a higher security level existing in the same firmware may be used when an integrity check value of a library file is generated.

The storage may include an RW zone, an RO zone and a trust zone having different security levels, and the at least one second file may include a file stored in the RO zone if the first file is stored in the trust zone. Accordingly, a method of relating a file in the RO zone existing in the same firmware may be used when an integrity check value of a library file is generated.

The generation of the first file may include an update of the first file. Accordingly, even if a library file has been updated, an integrity check value of the library file is generated by relating the library file to other library files in the same firmware.

The plurality of files may include a shared object file that may be commonly used by the plurality of applications. Accordingly, if an SO file relating to an application has been abnormally replaced, the SO file is prevented from passing an integrity check logic for execution.

According to an embodiment of the disclosure, there is provided a computer program product. The computer program product includes: a memory configured to store a plurality of instructions therein; a processor, and the instructions are configured to, upon execution by the processor, corresponding to a request for execution of a first file from an application out of a plurality of files for displaying an image, generate a first integrity check value of a first file based on at least one second file and identify whether to execute the first file by identifying whether the generated first integrity check value is consistent with a second integrity check value generated based on the at least one second file before a request for execution of the first file is made.

According to an embodiment of the disclosure, if the library file has been abnormally replaced, the library file is prevented from passing an integrity check logic. Also, if the library file has been abnormally replaced, an execution of the application may be blocked.

The instruction may generate the first integrity check value by using the hash sum of the first file and the at least one second file. Accordingly, if a hacker replaces the library file updated through firmware with a vulnerable version of the same, the library file is prevented from passing an integrity check logic for execution.

According to an embodiment of the disclosure, there is provided a method for controlling a display apparatus. The method includes: generating a first integrity check value of a first file based on at least one second file corresponding to a request for execution of the first file from an application out of a plurality of files for displaying an image; and identifying whether to execute the first file by identifying whether the first integrity check value generated as above is consistent with a second integrity check value of the first file generated based on at least one second file before the request for execution of the first file is made.

According to an embodiment of the disclosure, if the library file has been abnormally replaced, the library file is prevented from passing an integrity check logic. Also, if the library file has been abnormally replaced, an execution of the application may be blocked.

The method may further include: communicating with a server generating and storing therein a second integrity check value of a first file based on at least one second file out of a plurality of files; receiving a second integrity check value of the first file from the server; and identifying whether the received second integrity check value is consistent with the first integrity check value corresponding to the request for execution of the first file. Accordingly, in order to block an execution of a library file if the hacker has replaced the library file with a vulnerable version of the same, the library file may be checked by using the integrity check value downloaded from the server.

The method may further include generating the first integrity check value by using a hash sum of the first file and the at least one second file. Accordingly, if a hacker replaces the library file updated through firmware with a vulnerable version of the same, the library file is prevented from passing an integrity check logic for execution.

The method may further include generating hash values of the first file and the at least one second file by using an encrypted key. Accordingly, security may be strengthened by using an encrypted key when an integrity check value of a library file is generated.

The at least one second file may include a file which is sequentially adjacent to the first file when the plurality of files is arranged in accordance with a predetermined standard. Accordingly, the method of relating a library file to other library files in a chain form, which other library files exist in the same firmware may be used when an integrity check value of the library file is generated.

The plurality of files may be stored in one of the RW zone, RO zone and trust zone having different security levels, and the at least one second file may include a file stored in the RO zone if the first file is stored in the RW zone. Accordingly, a method of relating a file in the RW zone existing in the same firmware to a file in the RO zone may be used when an integrity check value of a library file is generated.

The plurality of files may be stored in one of the RW zone, RO zone and trust zone having different security levels, and the at least one second file may include a file stored in the zone of the storage having a higher security level than the first file. Accordingly, a method of relating a file in the zone with a higher security level existing in the same firmware may be used when an integrity check value of a library file is generated.

The plurality of files may be stored in one of the RW zone, RO zone and trust zone having different security levels, and the at least one second file may include a file stored in the RO zone if the first file is stored in the trust zone. Accordingly, a method of relating a file in the RO zone existing in the same firmware may be used when an integrity check value of a library file in the zone having the highest security level is generated.

The generation of the first file may include an update of the first file. Accordingly, even if a library file has been updated, an integrity check value of the library file is generated by relating the library file to other library files in the same firmware.

The plurality of files may comprise a shared object file that the plurality of applications may commonly use. Accordingly, if an SO file relating to an application has been abnormally replaced, the SO file is prevented from passing an integrity check logic for execution.

Advantageous Effects

As described above, according to the disclosure, there is an effect of preventing a library file relating to an application from being executed through integrity check if the library file has been abnormally replaced.

According to the disclosure, there is an effect of restraining an application from performing an erroneous operation if a library file has been abnormally replaced.

DESCRIPTION OF DRAWINGS

FIG. 7 illustrates an example of checking an integrity of an SO file in a manner of relating files of an RO zone and RW zone to each other according to an embodiment of the disclosure.

FIG. 9 illustrates an example of checking an integrity of an SO file in a manner of relating files to each other that exist in zones of different security levels according to an embodiment of the disclosure.

BEST MODE

Below, embodiments of the disclosure will be described in detail with reference to accompanying drawings, to be easily carried out by a person having an ordinary skill in the art. The disclosure may be embodied in various different forms, and not limited to the embodiment set forth herein. For clarity of description, like numerals refer to like elements throughout.

Figure 1:
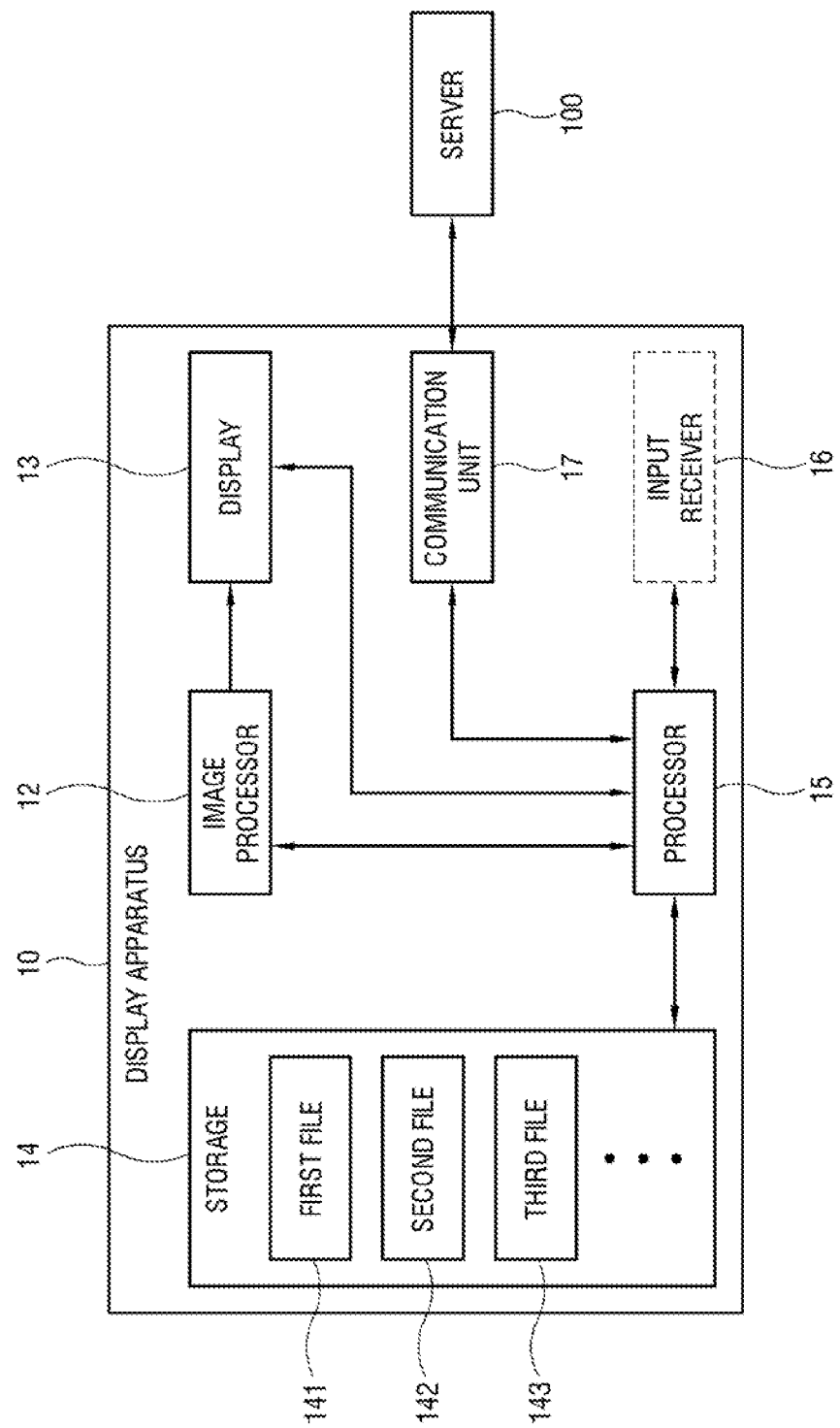
FIG. 1 is a block diagram of a display apparatus according to an embodiment of the disclosure.

FIG. 1 is a block diagram of a display apparatus according to an embodiment of the disclosure. As shown therein, a display apparatus 10 according to the disclosure includes an image processor 12, a display 13, a storage 14, a communication unit 17 and a processor 15, and may further include an input receiver 16. The display apparatus 10 may exchange data with a server 100 in a wired or wireless communication manner through the communication unit 17, which is a communicator. The display apparatus 10 is implemented as, e.g. a television, mobile device, tablet PC, PC, etc. Elements of the display apparatus 10 are not limited to those according to the embodiment of the disclosure. Some of the elements may be excluded from, or additional elements may be added to, the display apparatus 10 according to the disclosure.

The display apparatus 10 may proceed with a patch of a vulnerable version out of a plurality of library files, which are used when a predetermined application is executed, through a firmware update.

A hacker may have a backup of a vulnerable version of a library file, which was previously used, and attempt to attack the display apparatus 10 by replacing the updated library file with the vulnerable version of the same.

By using the foregoing configuration, the display apparatus 10 according to the disclosure may block an execution of the vulnerable version of the library file, which has passed an integrity check logic, even if a hacker replaces the updated library file with the vulnerable version of the same.

The image processor 12 performs a preset signal processing process with respect to an image signal or a broadcasting signal transmitted from the outside. Examples of signal processing by the image processor 12 include demultiplexing, decoding, de-interlacing, scaling, noise reduction, detail enhancement, etc. and the types of signal processing are not limited to the foregoing. The image processor 12 may be implemented as a system-on-chip (SOC) where various functions corresponding to such processes are integrated or as an image processing board where individual configurations are installed to independently perform each of the processes.

The display 13 displays an image thereon based on an image signal or broadcasting signal processed by the image processor 12. The method of implementing the display 13 is not limited, and the display 13 may be implemented as various forms such as a plasma display panel (PDP), a liquid crystal display (LCD), an organic light emitting diodes (OLED), and a flexible display.

The storage 14 stores therein a plurality of files 141, 142, 143, . . . to display an image on the display 13. As an example, the storage 14 may store therein a plurality of library files in relation to an execution of at least one application.

The storage 14 includes a first memory (not shown) and a second memory (not shown). The first memory is implemented as a non-volatile memory such as a flash memory to store data therein regardless of whether or not system power of the display apparatus 10 is provided.

The first memory stores therein a plurality of instructions to execute at least one application. The first memory causes reading, writing, editing, deletion, update, etc. to be performed with respect to the plurality of instructions stored as above.

The second memory is a high-speed buffer memory provided between the first memory and the processor 15 and is referred to as a cache memory or local memory. The second memory is faster in speed than a flash memory, and is accessible directly by the processor 15. The second memory stores therein data or program commands, which are frequently accessed by the processor 15, so that the data or program commands may be promptly used without being repeatedly searched. The second memory may be implemented as, e.g. a RAM. According to an embodiment of the disclosure, the second memory is implemented as a separate configuration, but the foregoing is an example of the disclosure. According to another embodiment of the disclosure, the second memory may be, e.g. integrally provided in the processor 15.

According to an embodiment of the disclosure, a plurality of files 141, 142, 143, . . . is stored in the first memory, and upon request for execution of a first file 141 out of the plurality of files 141, 142, 143, . . . , the first file 141 is loaded on the second memory and is executed.

The input receiver 16 receives a user input to control at least one of functions of the display apparatus 10. For example, the input receiver 16 may receive a user input to select a part of a user interface displayed by the display 13. The input receiver 16 may be implemented as an input panel provided in an external side of the display apparatus 10 or as a remote controller communicating with the display apparatus 10 in an infrared mode. In addition, the input receiver 16 may be implemented as a keyboard, mouse, etc. connected to the display apparatus 10 or as a touch screen provided in the display apparatus 10.

The processor 15 performs a control process to control a plurality of functions that the display apparatus 10 may perform. The processor 15 may be implemented as a central processing unit (CPU), and includes three areas of control, calculation and register. The control area interprets a program command, instructs each element of the display apparatus 10 to perform operations according to the meaning of the interpreted command. The calculation area performs an arithmetic operation and logical operation and performs an operation necessary for each element of the display apparatus 10 to operate according to an instruction by the control area. The register is a memory location where necessary information is stored while a CPU executes a command. The register stores commands and data on each element of the display apparatus 10 and stores a result of operation.

Figure 2:
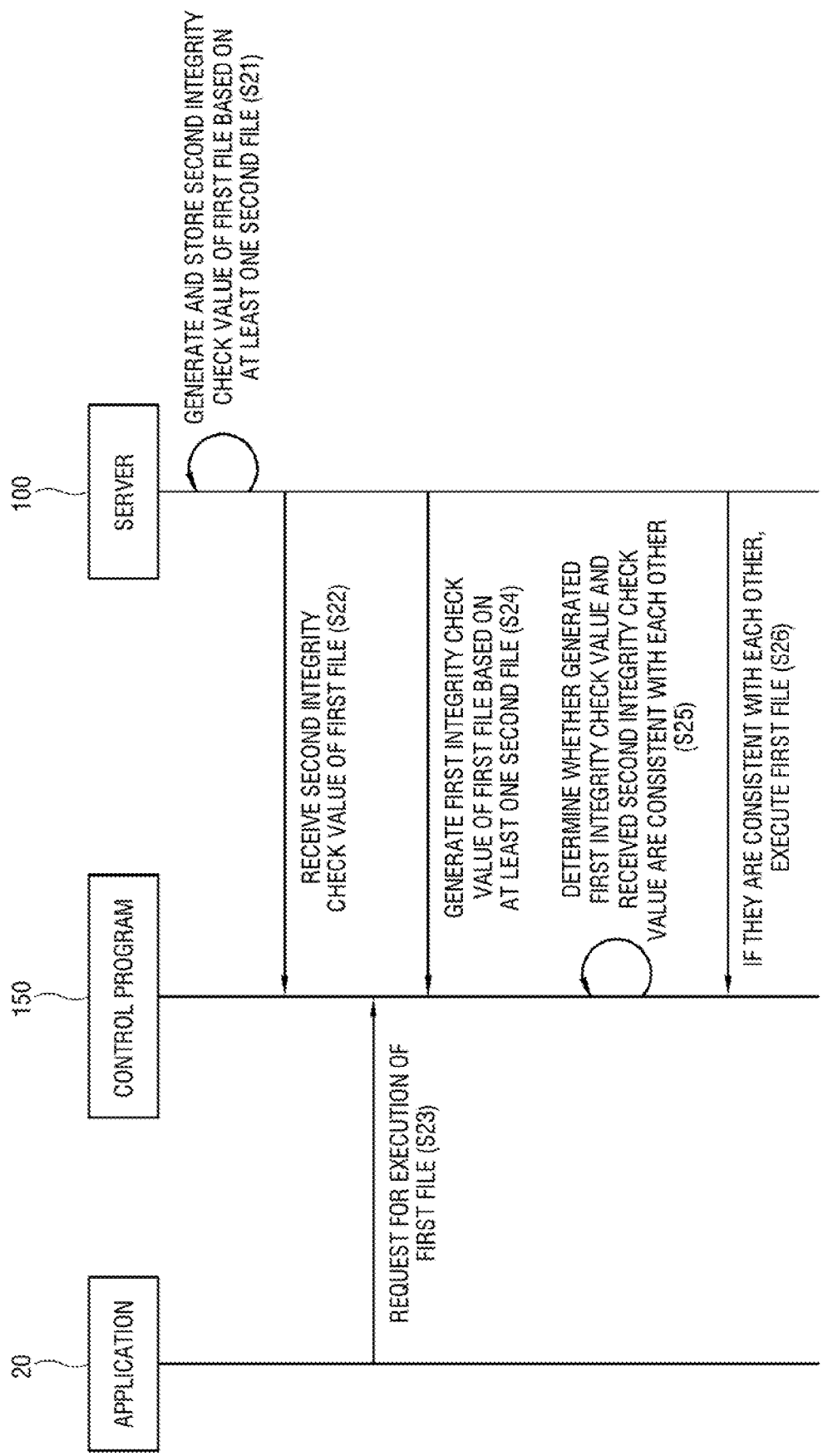
FIG. 2 is a flowchart showing operations among an application, a control program and a storage according to an embodiment of the disclosure.

According to an embodiment of the disclosure, operations of the processor 15 may be shown as operations among an application 20, a control program 150 and a server 17 as in the flowchart in FIG. 2. The control program 150 is at least one program that is executed by the processor 15, and may include, e.g. an operating system (OS) of the display apparatus 10.

At operation S21, the server 100 generates and stores therein a second integrity check value of the first file 141 based on at least one of second files 142, 143, . . . .

At operation S22, the control program 150 receives the second integrity check value of the first file 141 from the server 100.

Upon request for an execution of the first file 141 from the application 20 at operation S23, the control program 150 generates a first integrity check value of the first file 141 based on at least one of second files 142, 143, . . . at operation S24.

According to an embodiment of the disclosure, the first integrity check value may be generated by using a hash sum of the first file 141 and at least one of second files 142, 143, . . . . By using an encrypted key stored in the display apparatus 10, hash values of each of the first file 141 and at least one of second files 142, 143, . . . are calculated and then the respective hash values calculated as above are added up to generate a hash sum.

At operation S25, it is determined or identified whether the first integrity check value generated at operation S24 and the second integrity value received at operation S22 are consistent with each other.

Lastly, at operation S26, if the first integrity check value and the second integrity check value are consistent with each other, the first file 141 is executed.

As described above, the display apparatus 10 according to the disclosure may compare the second integrity check value of the first file downloaded from the server 100, and the first integrity check value generated at the request for execution of the first file 141 from the application, and if they are not consistent with other, the display apparatus 10 according to the disclosure may determine that the file has been abnormally replaced by a hacker and may restrict the execution of the first file 141. For example, if a library file has been replaced with a previous vulnerable version of the same due to a hacker's attack, the display apparatus 10 may block an execution of the library file to prevent the relevant application from performing an erroneous operation.

The display apparatus 10 according to the disclosure may download from a separate computer program product (not shown), and execute, an instruction to perform an integrity check operation with respect to a library file rather than causing the processor 15 to perform an integrity check operation with respect to a library file.

According to an embodiment of the disclosure, a computer program product includes a memory storing an instruction therein, and a processor. The instruction includes, upon execution by the processor, generating a first integrity check value of a first file based on at least one second file and determining whether the generated first integrity check value is consistent with a second integrity check value of the first file that has been generated based on at least one second file prior to the request for execution of the first file, and determining whether to execute the first file, corresponding to request for execution of the first file from an application out of a plurality of files for displaying an image.

According to an embodiment of the disclosure, the instruction may generate a first integrity check value and a second integrity check value by using a hash sum of the first file and at least one second file. Accordingly, even if a hacker replaces a library file, which has been updated through firmware, with a vulnerable version of the library file, the vulnerable version of the same is prevented from passing an integrity check logic for execution.

Figure 3:
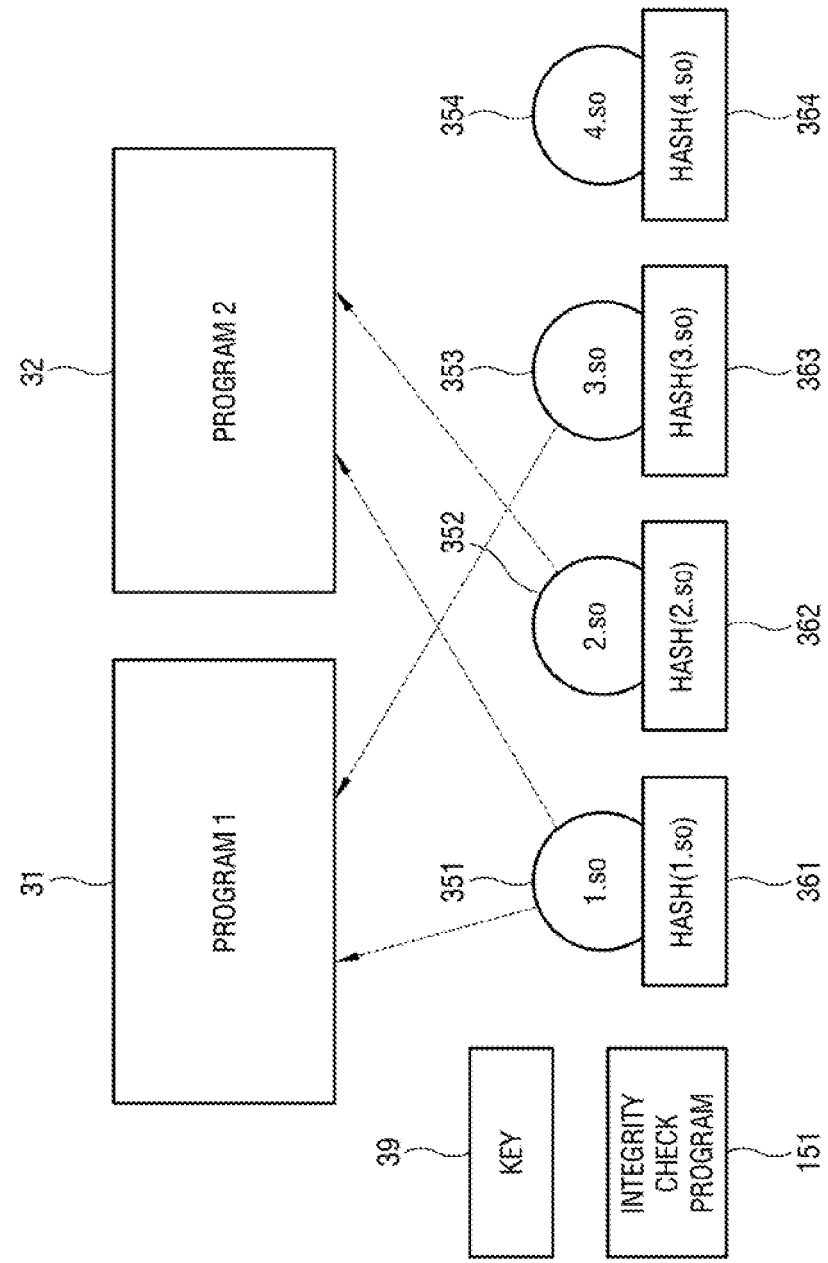
FIG. 3 illustrates an example of generating an integrity check value of a shared object (SO) file that is used when a program according to a relevant technology of the disclosure is executed.

FIG. 3 illustrates an example of generating an integrity check value of a shared object (SO) file that is used when a program according to a relevant technology of the disclosure is executed. As shown therein, a plurality of SO files 351, 352, 353 and 354 is library files that are loaded and used when at least one of programs 31, 32 . . . is executed from the display apparatus 10. The plurality of SO files 351, 352, 353 and 354 may be simultaneously used by at least one of programs 31, 32 . . . .

In the example in FIG. 3, a program 1 31 uses first and third SO files 351 and 353 upon execution, and a program 2 32 uses first and second SO files 351 and 352.

The display apparatus 10 downloads from the server 100, and stores in the storage 14, the plurality of SO files 351, 352, 353 and 354. The plurality of SO files 351, 352, 353 and 354 includes an integrity check value that has been generated by the server 100 based on hash values 361, 362, 363 and 364 of the respective files.

If a vulnerability of the first SO file 351 of the plurality of SO files 351, 352, 353 and 354 is found, patch is performed through firmware update. In such case, the first SO file 351 is updated to a new version, and when the program 1 31 or program 2 32 is executed, the updated file is used.

However, there may be a case where the first SO file 351 is replaced with a previous vulnerable version of the same due to a hacker's attack. If the first SO file 351 which has been replaced with the vulnerable version is executed, the related program 1 31 or program 2 32 performs an erroneous operation.

As an example, if the program 1 31 requests for execution of the first SO file 351, the integrity check program 151 calculates a hash value of the first SO file 351 by using an encrypted key 39 stored in the display apparatus 10, and compares the hash value with an integrity check value 361 downloaded from the server 100.

The integrity check value 361 downloaded from the server 100, and the calculated hash value have the same value as they had been signed by using the same encrypted key 39. That is, although the first SO file 351 has been replaced with a vulnerable version by a hacker, the first SO file 351 passes an integrity check logic by the integrity check program 151.

In the related technology of the disclosure, if an SO file is abnormally replaced by a hacker, there arises an issue that a related program performs an erroneous operation.

Figure 4:
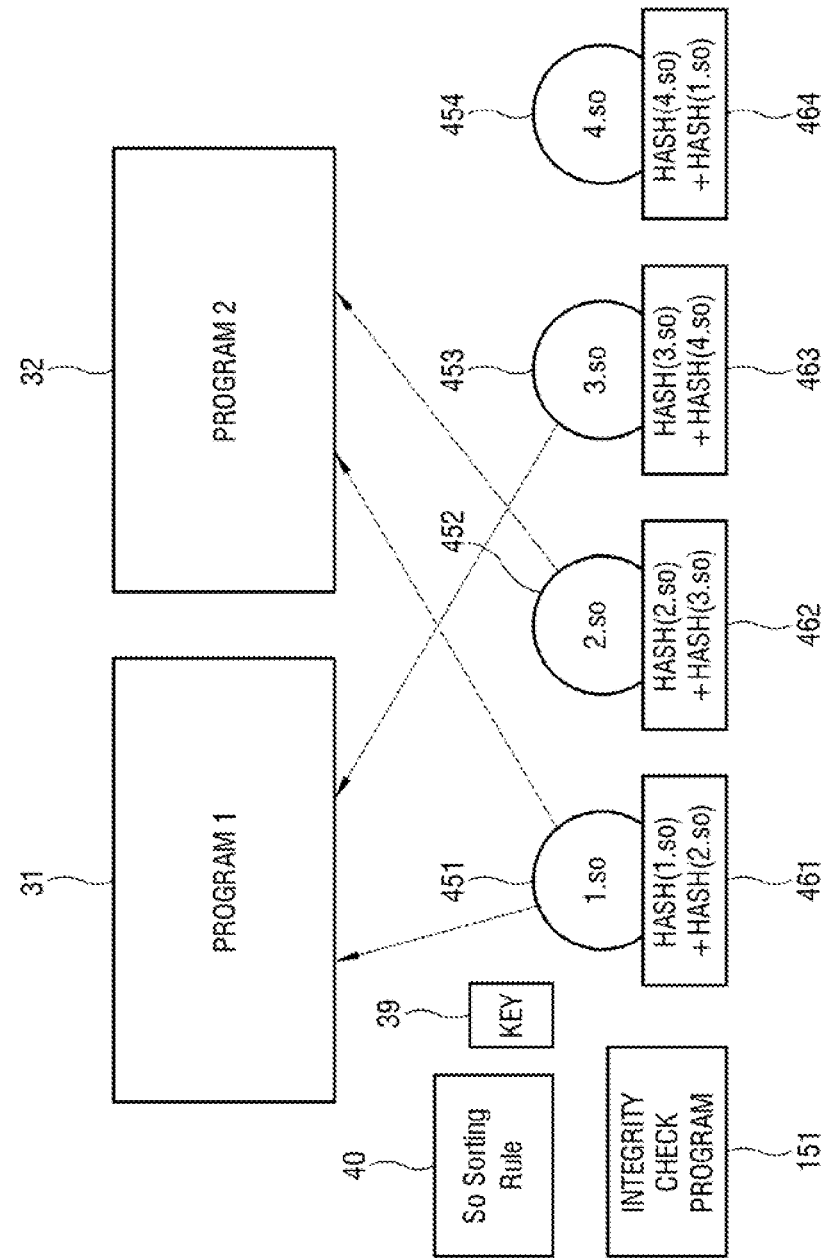
FIG. 4 illustrates an example of checking an integrity of an SO file in a manner of relating the SO file to an adjacent file according to an embodiment of the disclosure.

FIG. 4 illustrates an example of checking an integrity of an SO file in a manner of relating the SO file to an adjacent file according to an embodiment of the disclosure. The example in FIG. 4 falls under a case where an integrity of an SO file is checked by using a chain integrity check.

In the example in FIG. 4, the display apparatus 10 according to the disclosure downloads from the server 100, and stores therein, a plurality of SO files 451, 452, 453 and 454. The plurality of SO files 451, 452, 453 and 454 includes integrity check values 461, 462, 463 and 464, respectively, that have been generated by the server 100. The integrity check values 461, 462, 463 and 464 are those generated and stored by the server 100 by using hash values of the SO files 451, 452, 453 and 454 and adjacent SO files.

More specifically, the server 100 calculates respective hash values of the first SO file 451 and the second SO file 452, which is sequentially adjacent to the first SO file 451, and stores the sum of the hash values as an integrity check value 461 of the first SO file 451. Likewise, the server 100 calculates respective hash values of the second SO file 452 and the third SO file 453, which is sequentially adjacent to the second SO file 452, and stores the sum of the hash values as an integrity check value 462 of the second SO file 452.

Upon request for execution of the second SO file 452 from the program 2 32, the integrity check program 151 finds the first SO file 451 as a related file in accordance with an SO sorting rule 40 stored in the display apparatus 10.

Accordingly, the integrity check program 151 calculates respective hash values of the first and second SO files 451 and 452 by using the encrypted key 39 stored in the display apparatus 10, and compares the sum of the hash values and the integrity check value 461 downloaded from the server 100 and stored in the first SO file 451.

If the integrity check value 461 downloaded from the server 100 is consistent with the calculated hash sum of the first and second SO files 451 and 452, the integrity check program 151 determines that the first SO file 451 is in a normal state and allows an execution of the second SO file 452. Then, the program 2 32 performs a normal operation.

If the integrity check value 461 downloaded from the server 100 is not consistent with the calculated hash sum of the first and second SO files 451 and 452, the integrity check program 151 determines that the first SO file 451 has been abnormally replaced by a hacker and blocks an execution of the second SO file 452. Therefore, a performance by the program 2 32 of an erroneous operation as a result of execution of the first SO file 451 that has been abnormally replaced may be prevented.

In the foregoing example, the display apparatus 10 receives the integrity check values 461, 462, 463 and 464 which have been generated by the server 100 and checks the integrity of the SO files 451, 452, 453 and 454, but the disclosure is not limited to such example. The display apparatus 10 may otherwise generate the integrity check values 461, 462, 463 and 464 on its own and compare the values and a hash sum of related SO files to check the integrity, upon receipt of a request for execution of the SO file.

Figure 5:
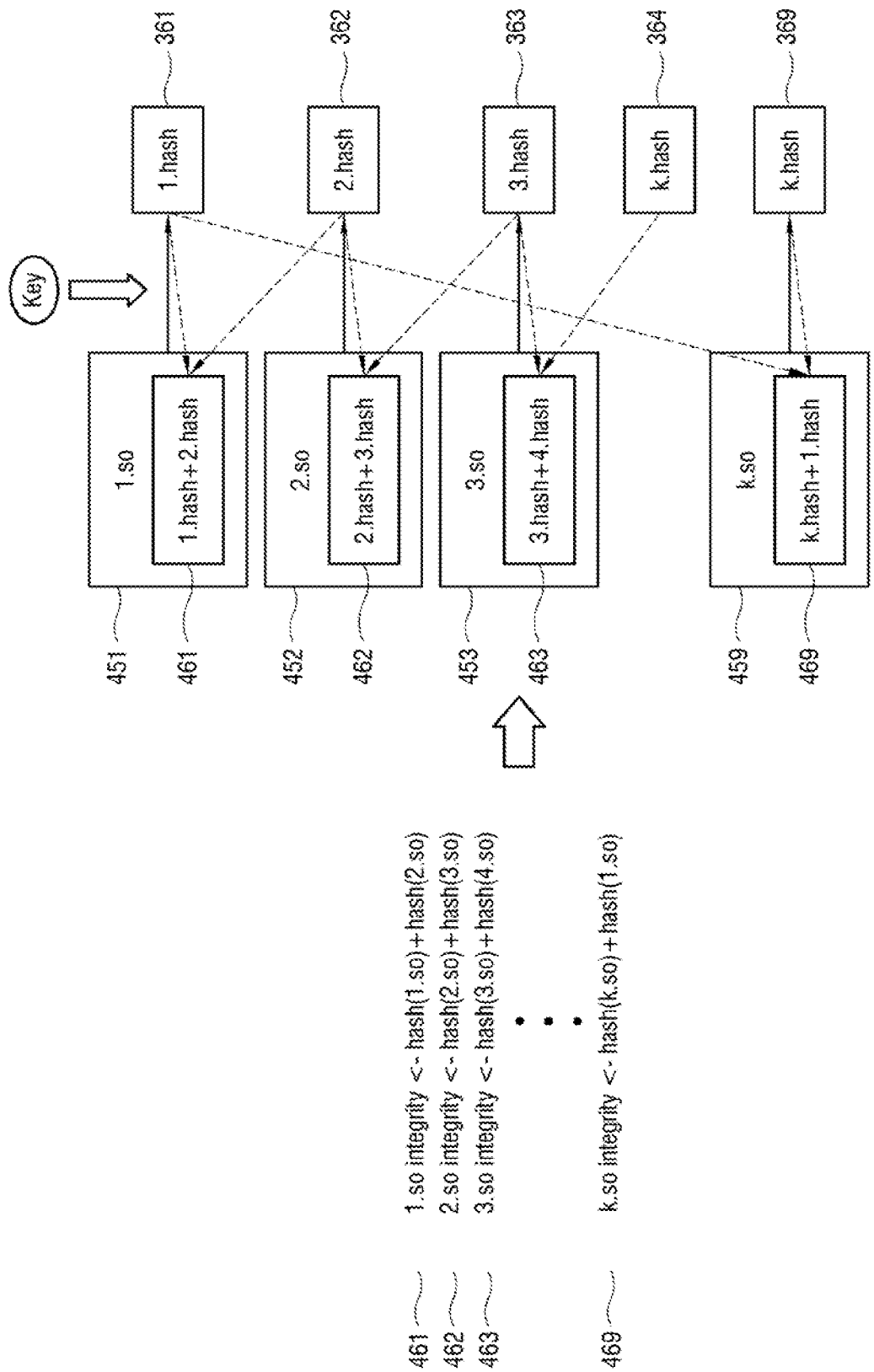
FIG. 5 illustrates an example of checking an integrity of an SO file in a manner of relating the SO file to an adjacent file according to an embodiment of the disclosure.

FIG. 5 illustrates an example of checking an integrity of an SO file in a manner of relating the SO file to an adjacent file according to an embodiment of the disclosure. The example in FIG. 5 shows a detailed method for generating integrity check values 461, 462, 463 and 469 by the server 100 with respect to the SO files 451, 452, 453 and 459 in case the chain integrity check method described in FIG. 4 is used.

In the embodiment of the disclosure, the server 100 causes the integrity check values 461, 462, 463 and 469 to be generated in the same manner not only when the respective SO files 451, 452, 453 and 459 are initially stored but also when a patch is performed through firmware update.

In the example in FIG. 5, the server 100 defines a hash sum 461, which is the sum of a hash value 361 of a first SO file 451 and a hash value 362 of a second SO file 452, and stores the hash sum 461 as an integrity check value of the first SO file 451. Likewise, the server 100 defines a hash sum 462, which is the sum of the hash value 362 of a second SO file 452 and a hash value 363 of a third SO file 453, and stores the hash sum 462 as an integrity check value of the second SO file 452. With respect to the third SO file 453 and a Kth SO file 459, the server 100 likewise defines hash sums 463 and 469 of adjacent files and store the hash sums 463 and 469 as integrity check values.

Below, a case where the first SO file 451 has been replaced with an abnormal file by a hacker while the SO files 451, 452, 453 and 459 have been patched by firmware update will be explained as an example.

Upon request for execution of the second SO file 452 from the program 2 32, the server 100 calculates a hash sum, which is the sum of a hash value of the first SO file 451 related to the second SO file 452, and a hash value of the second SO file 452 by using an encrypted key 39 stored in the display apparatus 10. As the hash sum of the first and second SO files 451 and 452 is the one calculated when the first SO file 452 has been replaced with an abnormal file, the hash sum is different from the integrity check value 461 of the first SO file 451 downloaded from the server 100.

That is, when an integrity of the second SO file 452 is checked, since the hash value of the adjacent first SO file 451 is different from the one before the update, the hash sum calculated for the first SO file 451 is not consistent with the integrity check value 461 downloaded from the server 100 and stored in the first SO file 451. Therefore, the first SO file 451 fails to pass the integrity check logic.

As described above, the display apparatus 10 according to the disclosure may prevent a program from performing an abnormal operation due to hacking, by relating in a chain form a library file to adjacent library files existing in the same firmware at the time of generating the integrity check value of the library file, to thereby prevent a program from operating an abnormal operation due to hacking.

Figure 6:
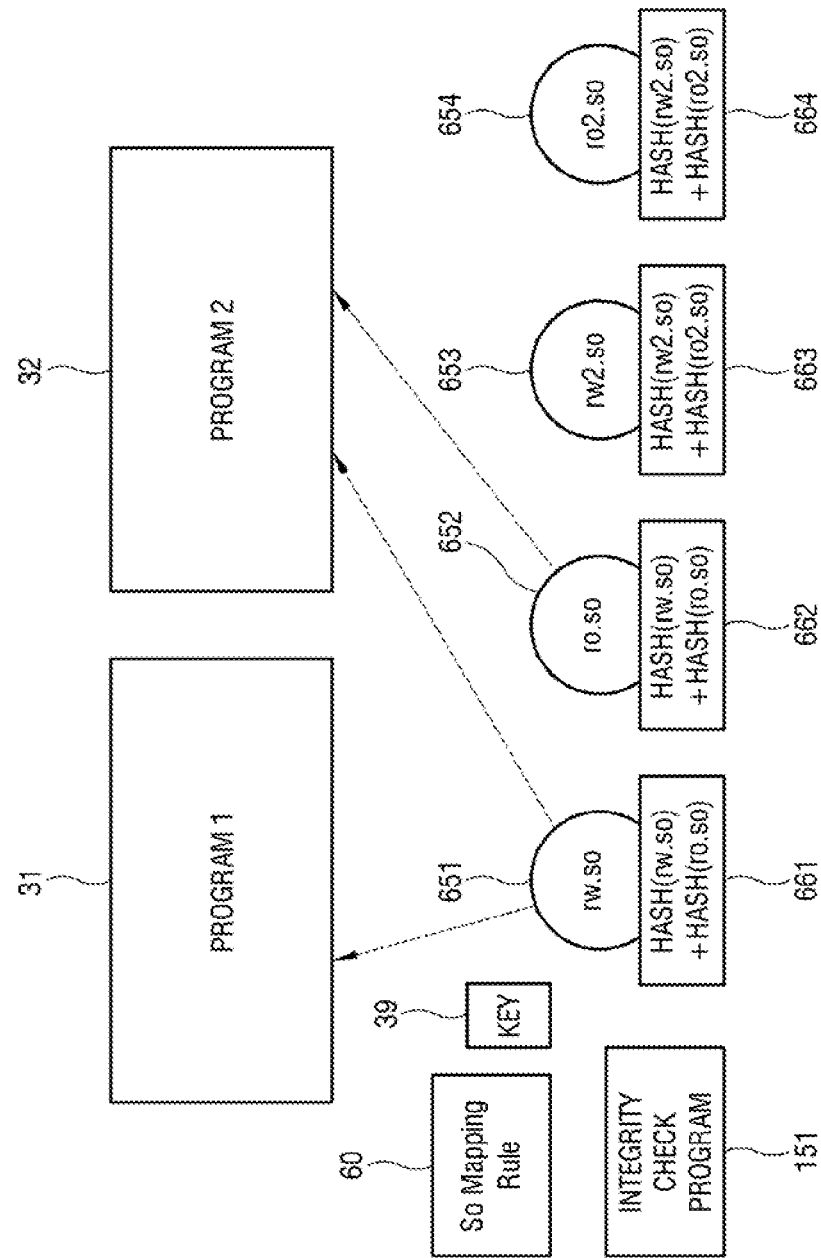
FIG. 6 illustrates an example of checking an integrity of an SO file in a manner of relating the SO file to files of an RO zone and RW zone according to an embodiment of the disclosure.

FIG. 6 illustrates an example of checking an integrity of an SO file in a manner of relating the SO file to files of an RO zone and RW zone according to an embodiment of the disclosure. The example in FIG. 6 falls under a case where the integrity of the SO file is checked by using a peer integrity check.

In the example in FIG. 6, the display apparatus 10 according to the disclosure downloads from the server 100, and stores, a plurality of SO files 651, 652, 653 and 654. The plurality of SO files 651, 652, 653 and 654 includes integrity check values 661, 662, 663 and 664 generated by the server 100. The integrity check values 661, 662, 663 and 664 are those generated and stored by the server 100 by using hash values of corresponding SO files 651, 652, 653 and 654 by matching the files in read-only (RO) and read-write (RW) zones on a 1:1 basis. More specifically, the server 100 calculates hash values of a first RW_SO file 651 and a first RO_SO file 652, respectively, and stores the sum of the calculated hash values as integrity check values 661 and 662 of the first RW_SO file 651 and the first RO_SO file 652. Likewise, the server 100 calculates hash values of a second RW_SO file 653 and a second RO_SO file 654, respectively, and stores the sum of the calculated hash values as integrity check values 663 and 664.

Upon request for execution of the first RW_SO file 651 from the program 1 31, the integrity check program 151 finds the first RO file 652 as a related file in accordance with the SO mapping rule 60 stored in the display apparatus 10.

Then, the integrity check program 151 calculates hash values of the first RW_SO file 651 and the first RO_SO file 652 by using the encrypted key 39 stored in the display apparatus 10, compares the hash sum of the foregoing hash values and the integrity check value 662 downloaded from the server 100 and stored in the first RO_SO file 652.

If the integrity check value 662 stored in the first RO_SO file 652 is consistent with the calculated hash sum of the first RW_SO file 651 and the first RO_SO file 652, the integrity check program 151 determines that the first RO_SO file 652 is in a normal state and allows an execution of the first RW_SO file 651. Therefore, the program 1 31 performs a normal operation.

Meanwhile, if the integrity check value 662 downloaded from the server 100 and stored in the first RO_SO file 652 is not consistent with the calculated hash sum of the first RW_SO file 651 and the first RO_SO file 652, the integrity check program 151 determines that the first RO_SO file 652 has been abnormally replaced by a hacker and blocks an execution of the first RW_SO file 651. Therefore, a performance by the program 1 31 of an erroneous operation due to execution of the first RO_SO file 651 which has been abnormally replaced may be prevented.

FIG. 7 illustrates an example of checking an integrity of an SO file in a manner of relating files of an RO zone and RW zone to each other according to an embodiment of the disclosure. The example in FIG. 7 illustrates a method of generating integrity check values 661 and 662 by the server of SO files 651 and 652 stored in an RW zone or RO zone when the peer integrity check in FIG. 6 is used.

In the embodiment of the disclosure, the server 100 causes the integrity check values 661 and 662 to be generated in the same manner not only when the respective SO files 651 and 652 are initially stored but also when a patch is performed through firmware update.

In the example in FIG. 7, the server 100 defines hash sums 661 and 662, which are the sums of a hash value of a first RW_SO file 651 stored in the RW zone and a hash value of a first RO_SO file 652 stored in the RO zone, and stores the hash sums 661 and 662 as integrity check values of the first RW_SO file 651 and the first RO_SO file 652.

As described above, the display apparatus 10 according to the disclosure may prevent a program from performing an abnormal operation due to hacking, by relating a library file to other library files, on a 1:1 basis, which other library files exist in the RW zone or RO zone at the time of checking the integrity of the library file, to thereby prevent a program from operating an abnormal operation by hacking.

Figure 8:
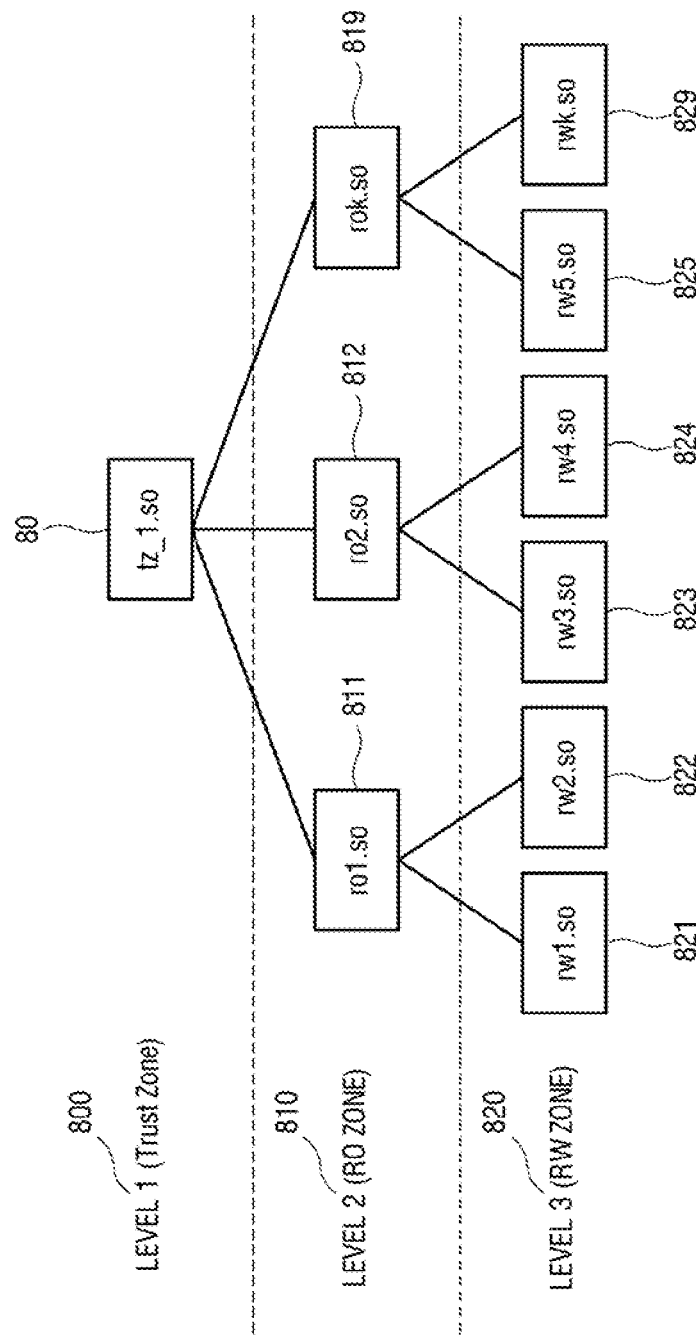
FIG. 8 illustrates an example of storage zones having different security levels according to an embodiment of the disclosure.

FIG. 8 illustrates an example of storage zones having different security levels according to an embodiment of the disclosure. The example in FIG. 8 falls under a case where an integrity of an SO file is checked by using a root of integrity check.

In the example in FIG. 8, the display apparatus 10 according to the disclosure downloads from the server 100, stores therein, a plurality of SO files 80, 811, 812, 813, 821, 822, 823, 824, 825 and 829. The plurality of SO files 80, 811, 812, 813, 821, 822, 823, 824, 825 and 829 includes integrity check values (see reference numerals 831 to 838 in FIG. 9) that have been generated by the server 100.

The display apparatus 10 stores the plurality of SO files 80, 811, 812, 813, 821, 822, 823, 824, 825 and 829, which have been downloaded from the server 100, stores in storage zones having different security levels, e.g. in an RW zone 820, an RO zone 810 and a trust zone 800.

The trust zone 800 is a storage zone with a highest security level, where file replacement is most difficult within the display apparatus 10. The security level of the RO zone 810 is lower than that of the trust zone 800, and is higher than that of the RW zone 820. The RO zone 810 falls under a zone where file replacement is more difficult than the RW zone 820. The RW zone 820 is a storage zone having the lowest security level, where file replacement can be made without difficulty.

In the example in 8, the trust zone 800 stores therein a first TZ_SO file 80, an RO zone 810 stores therein a first RO_SO file 811, a second RO_SO file 812 and a kth RO_SO file 810.

An RW zone 820 stores therein a first RW_SO file 821, a second RW_SO file 822, a third RW_SO file 823, a fourth RW_SO file 824, a fifth RW_SO file 825 and a kth RW_SO file 829.

In an embodiment of the disclosure, the display apparatus 10 stores a plurality of SO files 811, 812, 813, 821, 822, 823, 824, 825 and 829, which have been downloaded from the server 100, in the RO zone 810 and RW zone 820. The plurality of SO files 811, 812, 813, 821, 822, 823, 824, 825 and 829 includes integrity check values (see reference numerals 831, 832, 833, 834, 835, 836 and 837 in FIG. 9) that have been generated by the server 100 by using hash values of the respective SO files in the manner of relating them to the files stored in the zone having a higher security level.

As an example, as shown in FIG. 9, the server 100 calculates hash values of a first RO_SO file 811 and a first TZ_SO file 80 of the RO zone 810 and trust zone 800, respectively, which RO zone 810 and trust zone 800 have a higher security level, and a hash value of a first RW_SO file 821, and stores the sum of the hash values calculated as above as an integrity check value 831 of the first RW_SO file 821 that is stored in the RW zone 820.

Likewise, the server 100 calculates a hash value of a first TZ_SO file 80 stored in the trust zone 800 having a higher security level, and a hash value of the first RO_SO file 811 stored in the RO zone 810, and hash values of a first RW_SO file 821 and a second RW_SO file 822 stored in the RW zone 820 having a lower security level, and stores the sum of the hash values calculated as above, as an integrity check value 835 of the first RO_SO file 811.

In another embodiment, with respect to the first TZ_SO file 80 stored in the trust zone 800, the server 100 generates an integrity check value (see reference numeral 838 in FIG. 9) by using hash values of respective files in a manner of relating the first TZ_SO file 80 to files in the RO zone 810 having a lower security level than the trust zone 800.

Upon request for execution of the first RO_SO file 811 from the program 1 31, the integrity check program 151 calculates hash values of the first TZ_SO file 80, the first RO_SO file 811, the first RW_SO file 821 and the second RW_SO file 822 by using an encrypted key 39 stored in the display apparatus 10, and compare the hash sum of the foregoing hash values and the stored integrity check value 835.

If the integrity check value 835 downloaded from the server 100 is consistent with the calculated hash sum of the first TZ_SO file 80, the first RO_SO file 811, the first RW_SO file 821 and the second RW_SO file 822, the integrity check program 151 determines that the first RO_SO file 811 is in a normal state, and allows an execution of the first RO_SO file 811. Therefore, the program 1 performs a normal operation.

If the integrity check value 835 downloaded from the server 100 is not consistent with the calculated hash sum of the first TZ_SO file 80, the first RO_SO file 811, the first RW_SO file 821 and the second RW_SO file 822, the integrity check program 151 determines that the first RO_SO file 811 has been abnormally replaced by a hacker, and blocks an execution of the first RO_SO file 811. Accordingly, a performance by the program 1 31 of an erroneous operation due to execution of the first RO_SO file 811 which has been abnormally replaced can be prevented.

Although a few embodiments of the disclosure have been described in detail, various changes can be made in the disclosure without departing from the scope of claims.

The invention claimed is:

1. A display apparatus comprising:
a display configured to display an image thereon;
a storage configured to store a plurality of files therein to display the image; and
a processor configured to:
based on a request for execution of a first file among the plurality of files from an application, identify at least one second file which is sequentially adjacent to the first file when the plurality of files is arranged in accordance with a predetermined standard,
generate a first integrity check value of the first file based on the identified at least one second file corresponding to the request for execution of the first file from the application, and
identify whether to execute the first file by identifying whether the first integrity check value generated as above is consistent with a second integrity check value of the first file that has been generated based on the at least one second file before the request for execution of the first file was made.

2. The display apparatus according to claim 1, further comprising a communicator for communicating with a server which generates and stores therein a second integrity check value of the first file based on the at least one second file, wherein the processor is configured to receive a second integrity check value of the first file from the server, and corresponding to a request for execution of the first file, and identify whether the received second integrity check value is consistent with the first integrity check value.

3. The display apparatus according to claim 1, wherein the processor is configured to generate the first integrity check value by using a hash sum of the first file and the at least one second file.

4. The display apparatus according to claim 3, wherein the processor is configured to generate hash values of the first file and the at least one second file by using an encrypted key.

5. The display apparatus according to claim 1, wherein the storage comprises a read write (RW) zone, a read-only (RO) zone and a trust zone having different security levels, and the at least one second file comprises a file stored in the RO zone if the first file is stored in the RW zone.

6. The display apparatus according to claim 1, wherein the storage comprises an RW zone, an RO zone and a trust zone having different security levels, and the at least one second file comprises a file stored in a zone in the storage that has a higher security level than the first file.

7. The display apparatus according to claim 1, wherein the storage comprises an RW zone, an RO zone and a trust zone having different security levels, and the at least one second file comprises a file stored in the RO zone if the first file is stored in the trust zone.

8. The display apparatus according to claim 1, wherein the generation of the first file comprises an update of the first file.

9. The display apparatus according to claim 1, wherein the plurality of files comprises a shared object file that may be commonly used by the plurality of applications.

10. A computer program product comprising:
a memory configured to store a plurality of instructions therein;
a processor; and
the instructions are configured to,
upon execution by the processor,
based on a request for execution of a first file among the plurality of files from an application, identify at least one second file which is sequentially adjacent to the first file when the plurality of files is arranged in accordance with a predetermined standard,
corresponding to the request for execution of the first file from an application out of the plurality of files, generate a first integrity check value of the first file based on the identified at least one second file and identify whether to execute the first file by identifying whether the generated first integrity check value is consistent with a second integrity check value generated based on the at least one second file before a request for execution of the first file is made.

11. A method for controlling a display apparatus comprising:
based on a request for execution of a first file among the plurality of files from an application, identify at least one second file which is sequentially adjacent to the first file when the plurality of files is arranged in accordance with a predetermined standard,
generating a first integrity check value of the first file based on the identified at least one second file corresponding to the request for execution of the first file from the application out of a plurality of files for displaying an image; and
identifying whether to execute the first file by identifying whether the first integrity check value generated as above is consistent with a second integrity check value of the first file generated based on at least one second file before the request for execution of the first file is made.

12. The method according to claim 11, further comprising:
communicating with a server generating and storing therein a second integrity check value of a first file based on at least one second file out of a plurality of files;
receiving a second integrity check value of the first file from the server; and
identifying whether the received second integrity check value is consistent with the first integrity check value corresponding to the request for execution of the first file.

13. The method according to claim 11, further comprising generating the first integrity check value by using a hash sum of the first file and the at least one second file.

14. The method according to claim 13, further comprising generating hash values of the first file and the at least one second file by using an encrypted key.

* * * * *